(12) United States Patent
Nguyen et al.

(10) Patent No.: US 11,044,589 B2
(45) Date of Patent: Jun. 22, 2021

(54) V2X NETWORK BASED RELAYING

(71) Applicant: QUALCOMM Incorporated, San Diego, CA (US)

(72) Inventors: Tien Viet Nguyen, Bridgewater, NJ (US); Kapil Gulati, Dover, DE (US); Junyi Li, Chester, NJ (US); Shailesh Patil, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/158,020

(22) Filed: Oct. 11, 2018

(65) Prior Publication Data
US 2020/0120459 A1 Apr. 16, 2020

(51) Int. Cl.
*H04W 4/44* (2018.01)
*H04W 40/22* (2009.01)

(52) U.S. Cl.
CPC ............ *H04W 4/44* (2018.02); *H04W 40/22* (2013.01)

(58) Field of Classification Search
CPC ..... H04W 40/22; H04W 84/12; H04W 80/04; H04W 4/44
See application file for complete search history.

(56) References Cited

U.S. PATENT DOCUMENTS

| 2004/0218577 | A1* | 11/2004 | Nguyen | H04B 7/2656 370/347 |
| 2006/0099946 | A1* | 5/2006 | Burgess | H04W 60/04 455/435.1 |
| 2007/0291689 | A1* | 12/2007 | Kapur | H04W 40/26 370/328 |
| 2009/0210773 | A1* | 8/2009 | Fang | H03M 13/2909 714/776 |

(Continued)

FOREIGN PATENT DOCUMENTS

| WO | 2011094653 A1 | 8/2011 |
| WO | 2018031526 A1 | 2/2018 |
| WO | 2018182590 A1 | 10/2018 |

OTHER PUBLICATIONS

International Search Report and Written Opinion—PCT/US2019/046512—ISA/EPO—dated Jan. 28, 2020

(Continued)

*Primary Examiner* — Chi Ho A Lee
(74) *Attorney, Agent, or Firm* — Arent Fox, LLP

(57) ABSTRACT

A method, a computer-readable medium, and an apparatus may be a base station configured to receive packets from a plurality of User Equipments (UEs), combine a subset of the packets from the plurality of UEs into a combined packet, and broadcast the combined packet from the base station. In some aspects, a UE may be configured to receive a combined packet in a broadcast from a base station, attempt to decode a plurality of packets combined in the combined packet, and transmit an indication to the base station indi- (Continued)

cating at least one packet in the combined packet for retransmission. In some aspects, a UE may be configured to generate a packet for relay from a base station, and transmit the packet to the base station with an indication indicating whether the base station should broadcast the packet as a single packet along with broadcasting the packet in a combined packet.

30 Claims, 14 Drawing Sheets

(56) References Cited

U.S. PATENT DOCUMENTS

| | | | | |
|---|---|---|---|---|
| 2012/0005304 A1* | 1/2012 | Guo | ................... | H04L 12/1836 709/217 |
| 2013/0148563 A1* | 6/2013 | Brueck | ................... | H04W 4/06 370/312 |
| 2014/0192659 A1* | 7/2014 | Tian | ................... | H04W 72/0453 370/252 |
| 2015/0305062 A1* | 10/2015 | Sung | ................... | H04W 74/002 370/329 |
| 2016/0119762 A1* | 4/2016 | Zhu | ................... | H04W 76/27 370/312 |
| 2016/0189365 A1* | 6/2016 | Lee | ................... | G06F 16/5854 382/103 |
| 2017/0118784 A1* | 4/2017 | Chen | ................... | H04W 16/14 |
| 2019/0037622 A1* | 1/2019 | Blasco Serrano | .. | H04W 72/042 |
| 2020/0092685 A1* | 3/2020 | Fehrenbach | ....... | H04B 7/15507 |

OTHER PUBLICATIONS

Partial International Search Report—PCT/US2019/046512—ISA/EPO—dated Nov. 21, 2019.

* cited by examiner

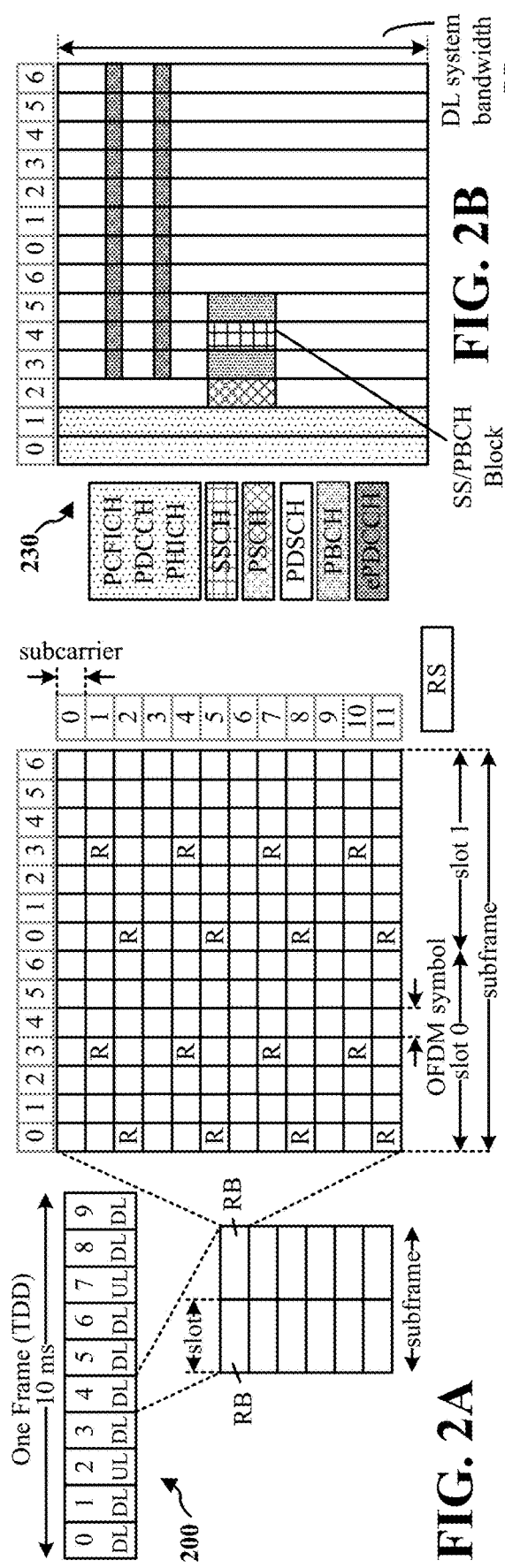
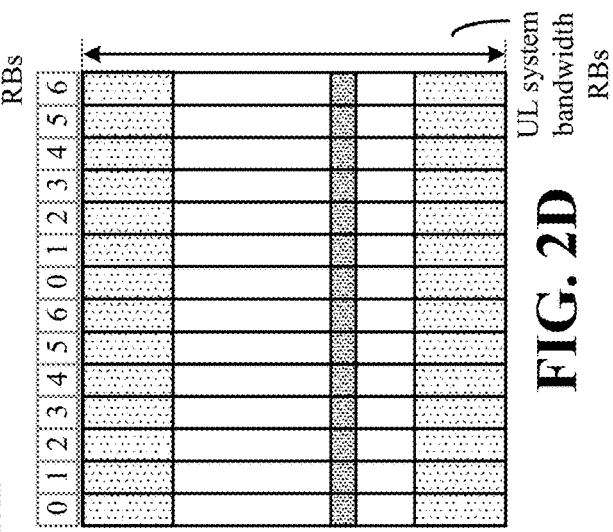
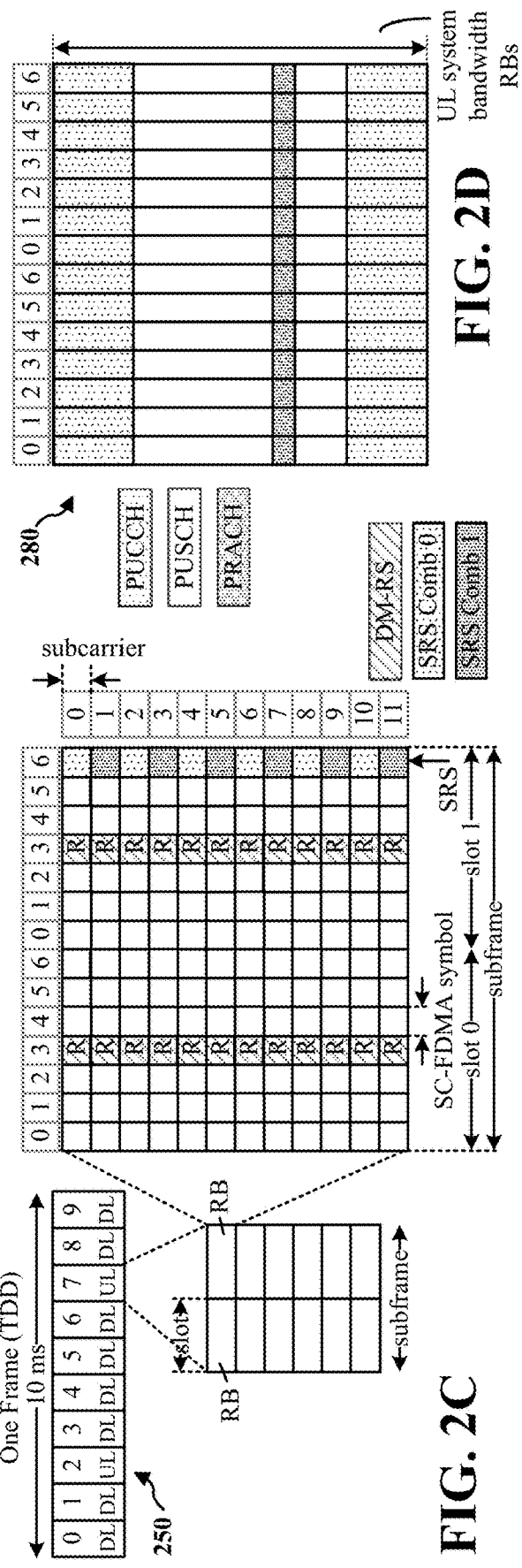

V2X NETWORK BASED RELAYING

INTRODUCTION

The present disclosure relates generally to communication systems, and more particularly, to vehicle-to-everything (V2X) communication, vehicle-to-vehicle (V2V), or other device-to-device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In V2X/V2V/D2D communication systems, a network base station may be used to relay messages. For example, a User Equipment (UE) or Vehicle User Equipment (VUE) may transmit messages to the base station using uplink (UL), and the base station may relay the messages by using downlink (DL) broadcast to all other UEs or VUEs. The network based V2X/V2V/D2D communication may have the advantage of better coverage range due to possible lower frequency, better path-loss, because a base station may be positioned at a higher location and/or have a stronger transmission power. However, the network base station may have limitations on capacity, especially if a higher quality of service (QoS) is targeted. There may be large amounts of aggregated traffic from multiple VUEs. Dedicated system resources for broadcasting may be limited. Further, in order to improve reliability, feedback and retransmission may be used. However, feedback and retransmission may be challenging for broadcast. Excessive feedback and retransmission may degrade the performance of the communication system. Aspects presented herein address these challenges of providing network based relaying in order to ensure high reception QoS while reducing feedback and retransmission overhead.

In an aspect of the disclosure, a method, a computer-readable medium, and an apparatus are provided. The apparatus may be a base station, e.g., in V2X/V2V/D2D wireless communication system. The base station may be configured to receive packets from a plurality of User Equipments (UEs) at the base station, combine a subset of the packets from the plurality of UEs into a combined packet, and broadcast the combined packet from the base station.

In another aspect of the disclosure, a method, a computer-readable medium, and an apparatus are provided. The apparatus may be a receiving device, such as a receiving UE performing V2X/V2V/D2D communication. The apparatus may be configured to receive a combined packet in a broadcast from a base station, attempt to decode a plurality of packets combined in the combined packet, and transmit an indication to the base station indicating at least one packet in the combined packet for retransmission.

In another aspect of the disclosure, a method, a computer-readable medium, and an apparatus are provided. The apparatus may be a transmitting device, e.g., a transmitting UE performing V2X/V2V/D2D communication. The apparatus may be configured to generate a packet for relay from a base station, and transmit the packet to the base station with an indication indicating whether the base station should broadcast the packet as a single packet along with broadcasting the packet in a combined packet with other packets.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
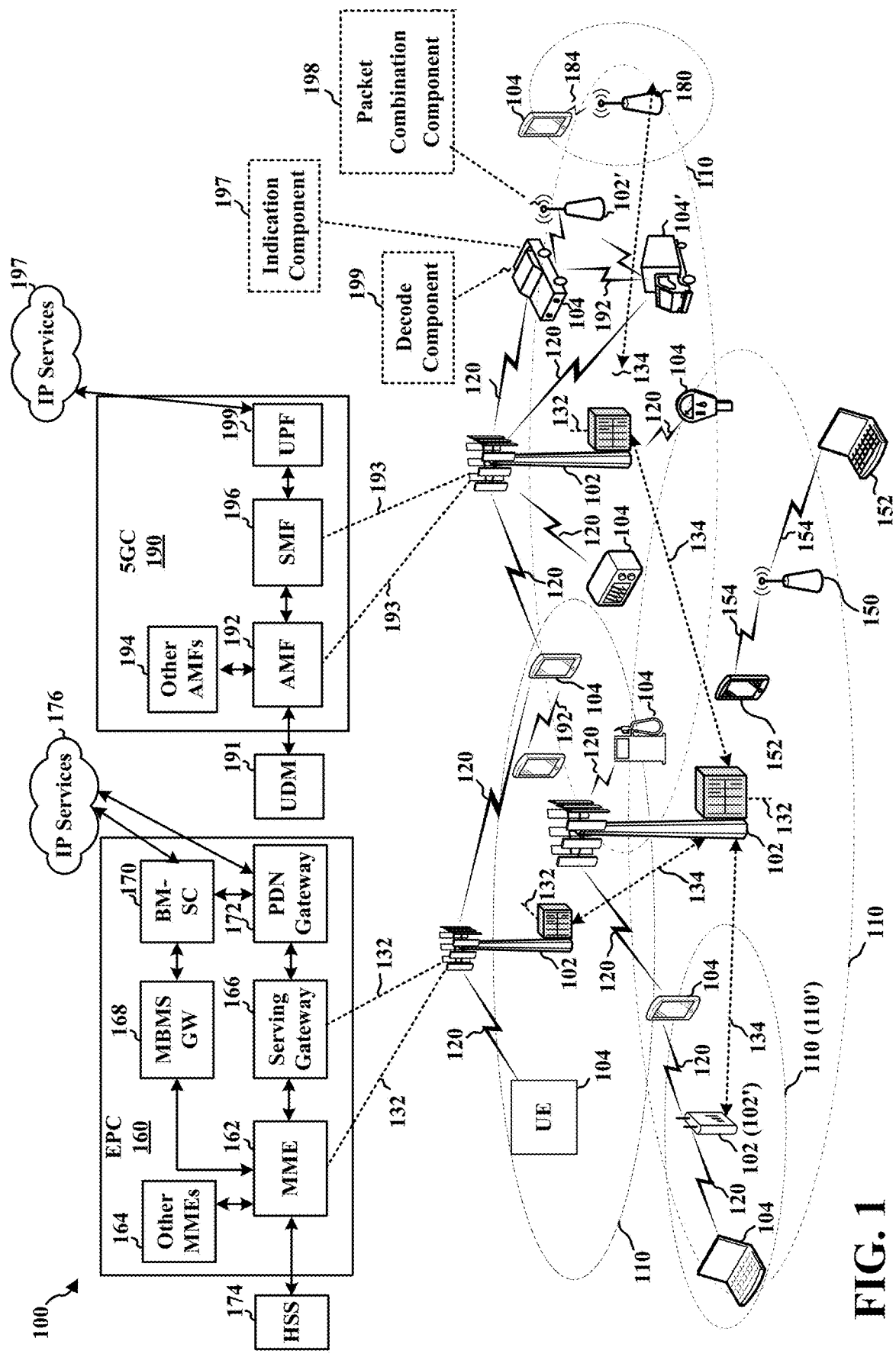
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102', e.g., in a V2X/V2V/D2D communication system, may comprise a packet combination component 198 that is configured to receive packets from a plurality of User UEs (e.g., 104, etc.) at the base station, combine a subset of the packets from the plurality of UEs into a combined packet, and broadcast the combined packet from the base station. In some aspects, a UE 104', e.g., in a V2X/V2V/D2D communication system, may comprise a decode component 199 that is configured to receive a combined packet in a broadcast from the base station, attempt to decode a plurality of packets combined in the combined packet, and/or an indication component 197 configured to transmit an indication to the base station indicating at least one packet in the combined packet for retransmission, as illustrated.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The sub-carrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
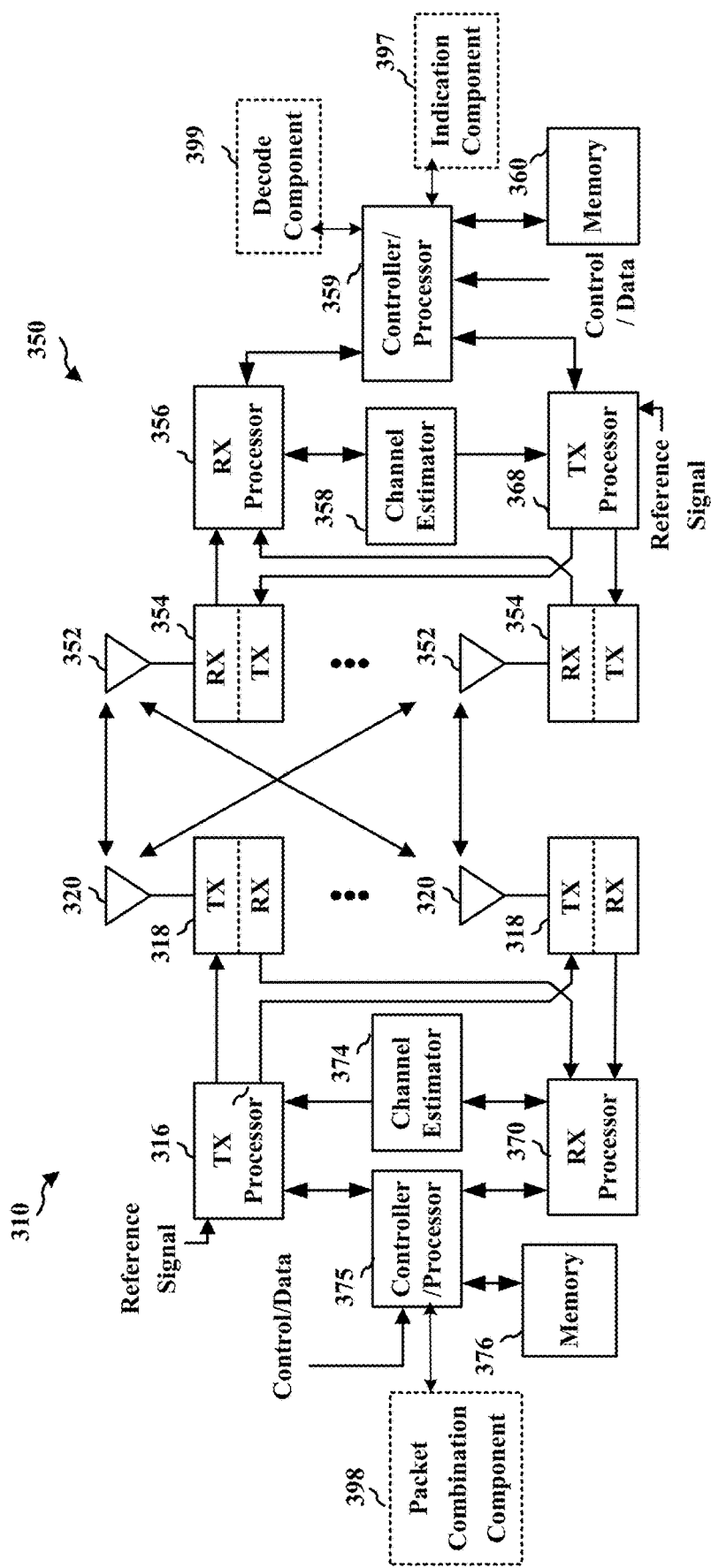
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. In addition to the other components illustrated in FIG. 3, the base station 310 may comprise a packet combination component 398, and the UE 350 may comprise a decode component 399 and/or an indication component 397. The packet combination component 398 may be configured to receive packets from a plurality of UEs, combine a subset of the packets from the plurality of UEs into a combined packet, and broadcast the combined packet from the base station. The decode component 399 may be configured to receive the combined packet in a broadcast from the base station, attempt to decode a plurality of packets combined in the combined packet. The indication component 397 may be configured to transmit an indication to the base station indicating at least one packet in the combined packet for retransmission. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
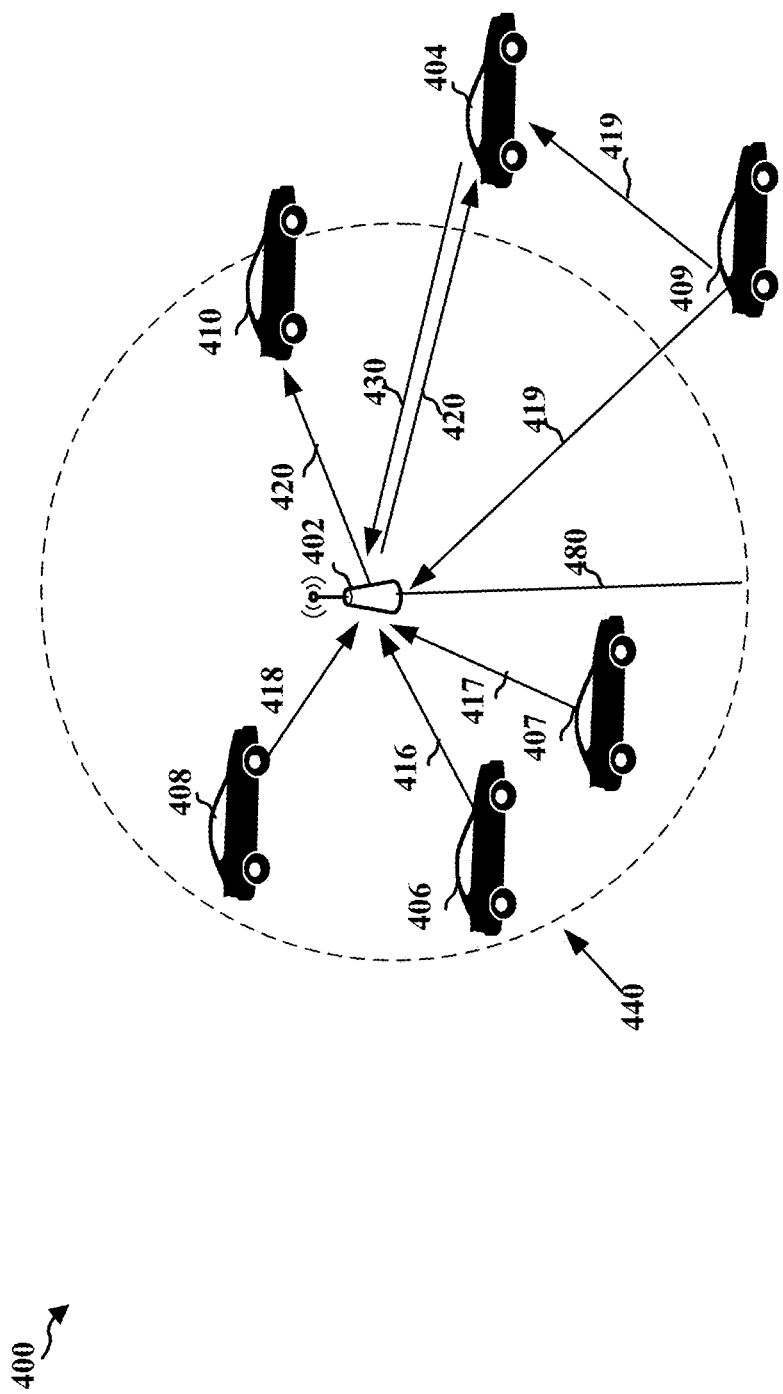
FIG. 4 is a diagram illustrating a base station relaying to UEs in a V2X/V2V/D2D communication system.

FIG. 4 is a diagram 400 illustrating a base station 402 relaying to UEs (e.g., vehicles) in a V2X/V2V/D2D wireless communication system. For example, the UEs 404, 410, 406, 407, 408, 409, etc. may be vehicles or devices installed in vehicles as part a V2V/V2X/D2D network, e.g., based on 5G/NR communication. Such V2V/V2X/D2D communication may involve the transmission of information from transmitting UEs, e.g., 406, 407, 408 and 409, to receiving UEs, e.g., any of 404 and 410. For example, the communication from the transmitting UEs (e.g., 406, 407, 408 and 409) may be transmitted to a base station 402 using UL, and the base station 402 may relay the communication by broadcasting using DL to all receiving UEs (e.g., 404, 410). While the example illustrates communication between vehicles, the aspects presented herein may also be applicable to any transmitting and/or receiving device engaged in V2X/V2V/D2D wireless communication. The transmitting and/or receiving devices may comprise a UE, such as a vehicle. Thus, although the aspects of the present application are described using the example of a receiving UE and a transmitting UE, the aspects are applicable to other devices that the UEs may be engaged in V2X/V2V/D2D wireless communication, such as a road side unit (RSU).

In some aspects, a V2X/V2V/D2D communication system may comprise a network base station. UEs, e.g., 406, 407, 408, 409, may transmit messages, using UL to the network base station 402. The network base station 402 may relay the messages using a DL broadcast to other UEs, e.g., 404, 410. The network based V2X may have improved range due to possible lower frequency and lower path-loss, because the base station may be positioned higher that the UEs and may have a higher transmission power. However, the network base station 402 may have limitations on capacity, especially if higher QoS is targeted. For example, there may be a large amounts of aggregated traffic from multiple UEs, whereas dedicated system resources for broadcasting such traffic may be limited. Furthermore, feedback and retransmission may be used to increase reliability in V2X communication. However, feedback and retransmission may be challenging for broadcasts from a base station. Assuming the aggregated traffic from all VUEs is reasonable, only VUE traffic with very high range demand might be relayed through the network. The network base station 402 may perform further filtering, header compression, data compression, etc. to reduced traffic. Excessive feedback and retransmission overhead may waste the system resources and degrade the reliability and coverage of the communication system. Therefore, it is desirable to ensure high reception QoS without excessive feedback and retransmission overhead.

In some aspects, network coding with limited feedback may be used to address the above problems. The base station may receive multiple packets from UEs and may combine the packets into a combined packet for relaying the packets in a DL broadcast from the base station. The packets comprised in a combined packet may have been received at the base station from different UEs. The combined packet may also be referred to as a coded packet. Aspects presented herein enable a base station to combine packets in a manner that improves the efficient use of wireless resources and that provides more effective communication of the packets.

For example, the traffic to be relayed by the base station over a period of time may be divided into multiple, combined packets of the same size. As an example, the size of each packet may ensure that after channel coding, the code block number is 1, such that each packet is transmitted using a single code block. If the number of code blocks is larger than 1, then if one of the transmitted code blocks is lost, the whole packet will be lost. For example, at the beginning of each transmission session, the network base station 402 may broadcast a list of all packets in the corresponding session. As an example, the base station may indicate a number of packets to be broadcast in the session. In one example, only the number of packets may be indicated, e.g., broadcasted, at the beginning of the session. At each broadcasting opportunity, the network base station 402 may broadcast one or more combined packets, e.g., coded packets. For example, a combined packet may be formed using an Exclusive Or (XOR) function on the original packets. For example, the base station may perform an XOR operation to generate the combined packet. This may enable the network to retransmit multiple individual packets from within the combined packet without needing to retransmit each individual packet at a time. A broadcasting opportunity can be either an Multimedia Broadcast multicast service Single Frequency Network (MBSFN) frame or a Single Cell Point To Multipoint (SC-PTM) resource.

For example, each UE, e.g., 404 or 410, may receive the broadcast of a combined packet from the base station 402 and attempt to recover the original packets that are combined into the combined packet. The UEs may use a message passing algorithm to recover original packets from the combined packet. Each UE, e.g., 404 or 410, may have limited feedback. The network base station 402 may stop transmitting the combined or coded packets when either all UEs have received all the packets, or when an upper bound on time has been met. The upper bound on the time may correspond to a time when the information in the session becomes obsolete. In another example, the upper bound may correspond to a time at which the network runs out of a broadcast opportunity.

While the receipt of packets as a larger, combined file may be beneficial. In certain applications, UEs may be interested in receiving as many packets as possible. The file size of the combined packet may be very large, so a degree of coding may need to follow a certain distribution in order to ensure good decoding performance and low decoding complexity at the receiving UEs.

In V2X/V2V/D2D communication systems, as shown in FIG. 4, each UE may only be interested in packets within a certain range. For example, UE 404 may be interested in packets within an area 440, e.g., packets 416, 417, and 418 from UEs 406, 407 and 408. The total number of packets of interest may be reduced due to delay constraint(s), and/or area constraint(s). For example, the total number of packets relayed by the base station may be smaller such as 50, 100 or fewer. The total number of packets may be larger, e.g., up to 500 or even more as well as any values therebetween. Additionally, some of the packets may already have been delivered to some extent by sidelink. For example, packet 419 from UE 409 may already been delivered to UE 404 by sidelink. Different packets may have a different packet delivery ratio target. For example, the packet 416 and packet 417 may have high delivery probability or QoS requirements, while the packet 418 may have low probability or QoS requirements. A delivery probability is a probability that a certain UE can receive a packet without any error. A delivery probability requirement is a requirement associated with a packet for a certain amount or certain level of delivery probability. The delivery probability may be estimated based on counting, over a period of time, a number of packets that were received in relation to the number of packets that were sent. Further, some reasonable amount of feedback from the UE to the base station may be allowed. Aspects presented herein improve provide for improved network based relaying in V2X/V2V/D2D communication systems in order to improve the reliability and coverage of the communication systems.

Figure 5:
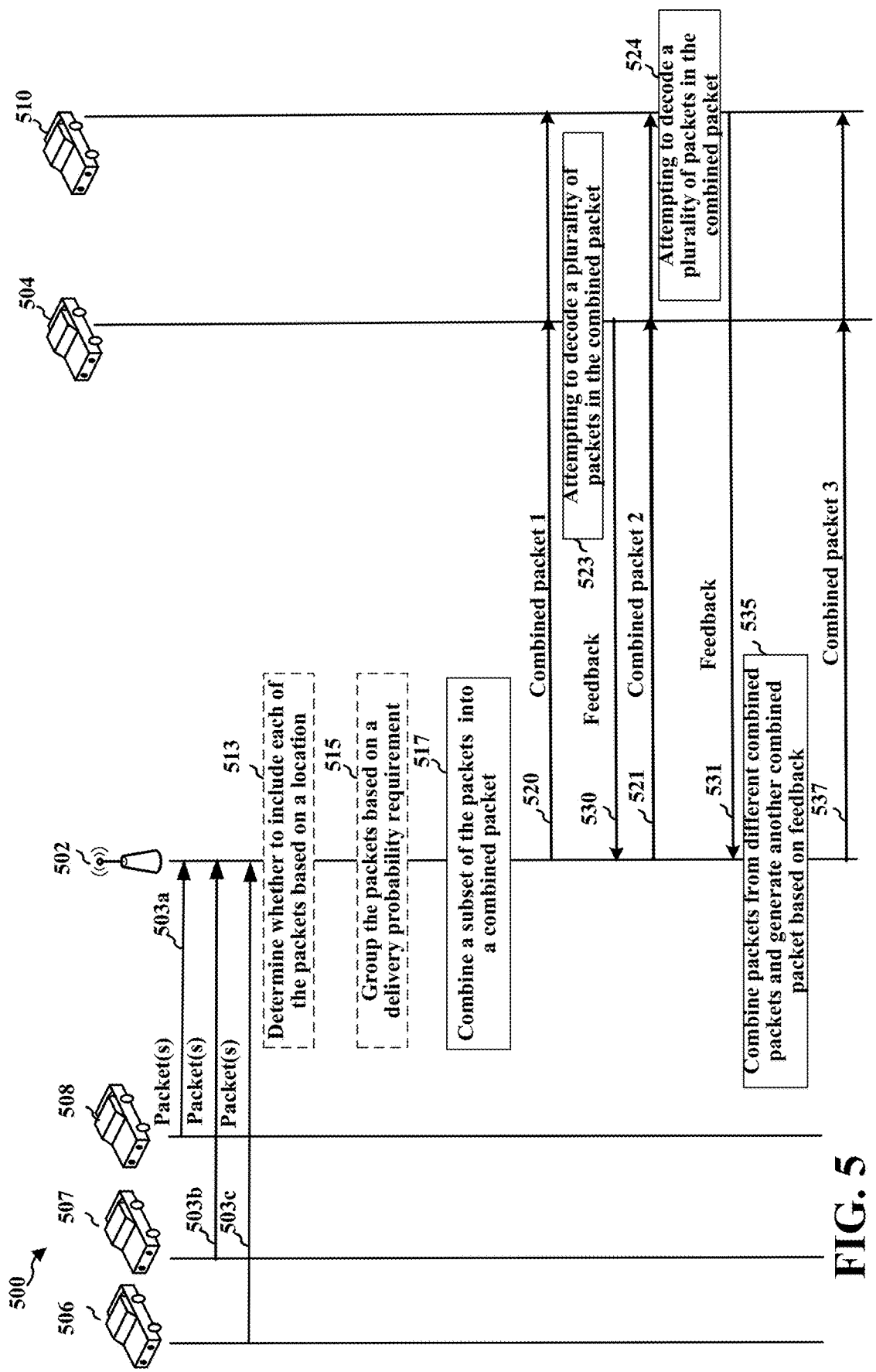
FIG. 5 is a diagram illustrating a solution to enhance network based relaying in V2X, V2V, and/or D2D communication.

FIG. 5 is a diagram illustrating a solution 500 to enhance network based relaying to UEs (e.g., vehicles) in a V2X/V2V/D2D wireless communication system. For example, the UEs 504, 510, 506, 507, 508 may be vehicles or devices installed in vehicles as part a V2V/V2X/D2D network, e.g., based on 5G/NR communication. Such V2V/V2X/D2D communication may involve the transmission of information from transmitting UEs, e.g., 506, 507, 508 to receiving UEs, e.g., any of 504 and 510. For example, the communication from the transmitting UEs (e.g., 506, 507, 508) may be transmitted to a base station 502, e.g., using UL. The communication may be broadcast from the UEs. The base station 502 may relay the communication by broadcasting, e.g., using DL, to receiving UE(s) (e.g., 504, 510). While the example illustrates communication between vehicles, the aspects presented herein may also be applicable to any transmitting and/or receiving device engaged in V2X/V2V/D2D wireless communication.

At 503a, 503b, 503c, etc., the transmitting UEs (e.g., 506, 507, 508) may transmit a plurality of packets to the base station 502 using UL communication. Although only three UEs are illustrated, any number of UEs may transmit at least one packet to the base station. Thus, the base station may receive the plurality of packets from one or more transmitting UEs. The base station may then relay the received packet(s), broadcasting the packets so that the packets can be received by other UE(s). For example, there may be two types of packets broadcast by the base station. One type of packet may be a single original packet, e.g., a system packet, that is not combined with other packets. The other type of packet may be a high degree XOR combined packet, which may also be referred to as a coded packet. For example, there may be an indication from the base station to indicate the type of packet that is being broadcast by the base station. The combined packet may be formed using an XOR function on the plurality of original packets, e.g., 503a, 503b, 503c, etc. received on the UL from UEs. For example, the base station may perform XOR operation to generate the combined packet or coded packet.

At 513, the base station 502 may determine whether to include each of the packets into the combined packet based on a location of each of the original packets. For example, the base station may combine packets within a local area into a combined packet. In one example, the local area may be a circular area, e.g., a circle with a radius d. The radius size d may be a parameter that can be adjusted. In other examples, the area may be non-circular. Referring to FIG. 4 and FIG. 5, in some aspects, the base station may determine a location associated with each of the packets received by the base station, and determine whether to include each of the packets in a particular combined packet based on whether the location associated with a corresponding packet received by the base station is within a particular area (e.g., 440). As shown in FIG. 4, for example, the local area may be in a circular shape with a radius 480 surrounding a certain location. The base station may decide to combine only packets 416, 417 and 418 from the local area 440 into the combined packet 420. The base station may determine to not include the packet 419 because the packet 419 did not originate within the local area 440. The local area may have different shapes other than the circular shape. For another example, the local area may be in a rectangular shape, e.g., a geographical zone. By combining only packets from the local area in the combined packet (coded packet), relaying transmission may be facilitated and the reliability of communication may be improved.

At 515, the base station 502 may group the packets based on a target delivery probability or QoS requirement. For example, packets with similar target delivery probability (QoS) may be combined together. For example, a target delivery probability of the combined packet is based on a maximum delivery probability requirement associated with any of the individual packets combined in the combined packet. The target delivery probability of a combined packet (coded packet) may be the maximum of each of the individual delivery probabilities. For example, the packet from UE 506 and the packet from UE 507 may have similar target delivery probability (QoS), while the packet from UE 508 may have a substantially different target delivery probability (QoS). The base station may combine the packet from UE 506 and the packet from UE 507 together. For example, the base station may allocate more resources to the combined packets with higher target delivery probability (QoS). The combined packets with higher target delivery probability (QoS) may consume more resources because of a higher delivery requirements.

At 520, the base station 502 may transmit a first combined packet by DL broadcasting to receiving UEs (e.g., 504, 510). At 521, the base station may broadcast a second combined packet 521. The combined packet 520 may include a combination of different packets than combined packet 521. After receiving the combined packet in a broadcast from the base station, the receiving UE (e.g., 504, 510) may attempt to decode a plurality of packets combined in the combined packet, as illustrated at 523, 524. For example, the UEs (e.g., 504, 510) may apply a Gaussian elimination to the combined packet received from the base station to recover the original packets.

At 530, the receiving UEs (e.g., 504, 510) may transmit feedback 530, 531 with an indication to the base station indicating at least one packet in the combined packet(s) for retransmission. For example, the receiving UEs (e.g., 504, 510) may feedback the list of packets for which retransmission is requested in order to facilitate the combined packet (coded packet) generation. The list of packets for retransmission may comprise a bitmap or a list of packet identifiers (IDs). For example, for 1000 packets, a bitmap may be 1000 bits, or equivalently 125 bytes.

At 530, UE 504 may transmit feedback 530 indicating that at least one packet from combined packet 520 was not received correctly and/or indicating a request for retransmission of at least one packet from combined packet 520. At 531, UE 510 may provide similar feedback for at least one packet from combined packet 521. At 535, the base station may combine the indicated packets from combined packet 1 520 and combined packet 2 521 and generate another combined packet 537, e.g., combined packet 3, based on the feedback 530, 531 with the indication received from the receiving UEs (e.g., 504, 510).

At 537, the base station may transmit the additional combined packet comprising the retransmission of at least one packet based on the feedback. In this way, excessive retransmission of all of the packets may be avoided. Additionally, feedback may be reduced by having the receiving UEs 504, 510 provide only an indication of packets within the combined packet for which a retransmission is needed. System resources may be saved, and thus, the reliability and coverage of the communication may be improved.

Figure 6:
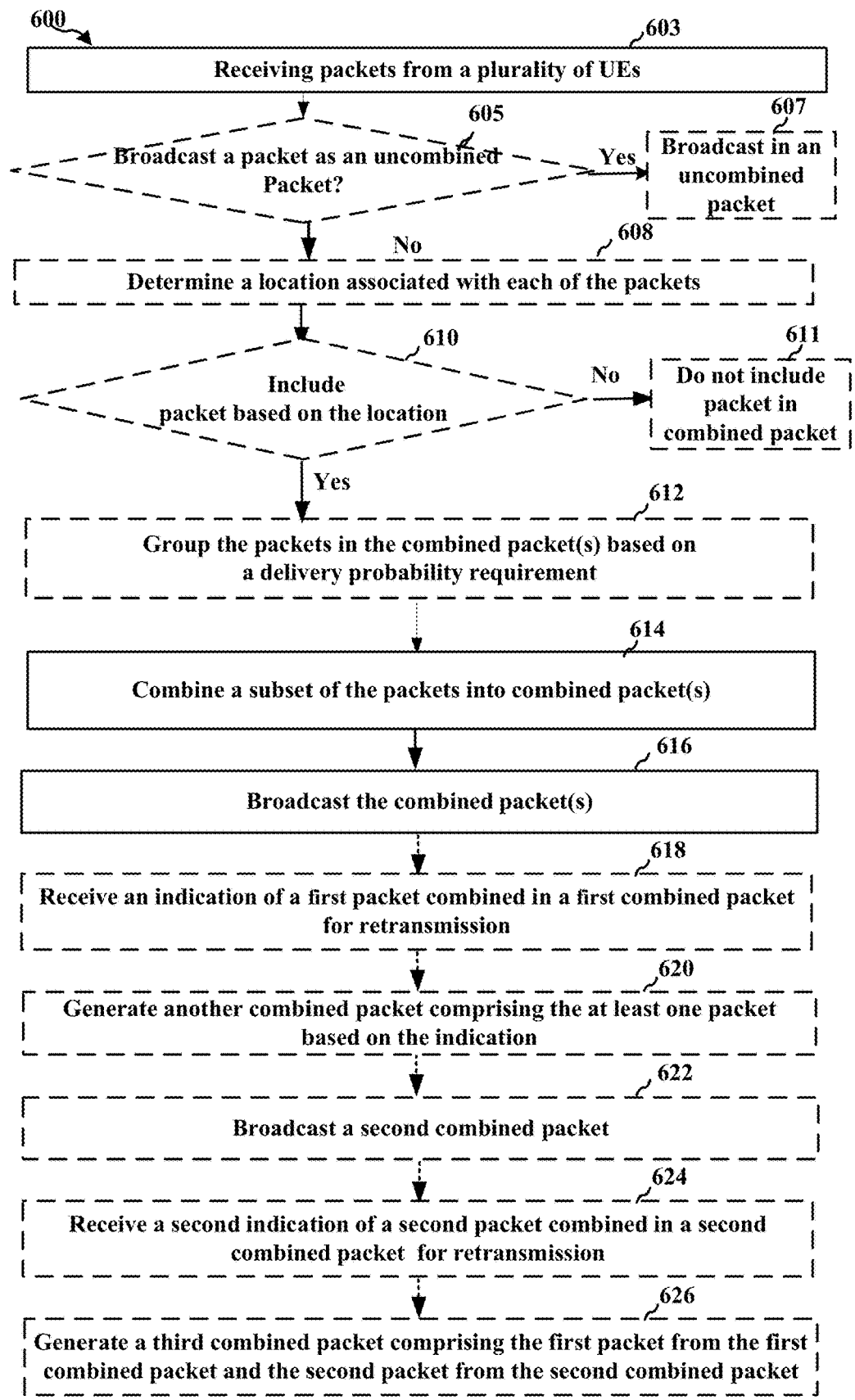
FIG. 6 is a flowchart of a method of wireless communication.

FIG. 6 is a flowchart of a method 600 of wireless communication. The method may be performed, for example, by a base station (e.g., the base station 102', 402, 502, the apparatus 702/702', 1050, 1350 etc.) communicating with UEs (e.g., UE 104, 104', 404, 406, 407, 408, 409, 410, 504, 506, 507, 508, 510, 750, 750', the apparatus 1002/1002', the apparatus 1302/1302' etc.) in a wireless communication system. The wireless communication may comprise 5G/NR V2X or V2V communication. Aspects may also be applied to other direct D2D communication. For example, the UEs may be vehicles, or devices installed in vehicles, or other devices, as part a V2V/V2X/D2D network, e.g., based on 5G/NR communication. To facilitate an understanding of the techniques and concepts described herein, the method of flowchart 600 may be discussed with reference to the examples illustrated in FIGS. 4 and 5. Optional aspects may be illustrated in dashed lines.

At 603, the base station may receive packets from a plurality of UEs (e.g., UE 104, 406, 407, 408, 409, 506, 507, 508) at the base station. FIG. 5 illustrates an example of a base station receiving packets 503*a*, 503*b*, 503*c* from a plurality of UEs. The packets may be received on an UL from the UEs.

At 608, in some aspects, the base station may determine a location associated with each of the packets received by the base station. At 610, the base station may determine whether to include each of the packets in a combined packet based on whether the location associated with a corresponding packet received by the base station is within an area. For example, the area may be based on a radius size surrounding a certain location. In other examples, the area may be non-circular. For example, the base station may combine only packets from a particular area in the combined packet. For example, if the packet is not from the particular area, the base station may determine not to include the packet in the combined packet, as at 611. Thus, only packets in the local area might be combined in a combined packet At 612, the base station may group the subset of the packets in the combined packet based on a delivery probability requirement associated with each of the subset of the packets. For example, a target delivery probability of the combined packet may be based on a maximum delivery probability requirement associated with any of the subset of the packets combined in the combined packet. For example, the combined packet may comprise a first combined packet and a second combined packet. A first set of packets having a first level of the delivery probability requirement may be included in the first combined packet, and a second set of packets having a second level of the delivery probability requirement may be included in the second combined packet. Thus, packets with similar target delivery probability may be combined together. For example, the first level may be higher than the second level, and a larger amount of resources may be allocated to the first combined packet than to the second combined packet.

At 614, the base station may combine a subset of the packets from the plurality of UEs into the combined packet(s). While this example at 614 describes a single combined packet, the base station may perform these aspects in generating a plurality of combined packets As described in connection with 535 in FIG. 5, the combined packet may be generated using an XOR function. The combined packet may also be referred to as a coded packet.

At 616, the base station may broadcast the combined packet(s). The base station may broadcast a single combined packet. The base station may broadcast a plurality of combined packets. Thus, the combined packet may be broadcast in a DL transmission from the base station. Thus, the combined packet may be relayed by the base station to improve range and coverage for the packets combined in the combined packet.

At 618, the base station may receive an indication from a UE of at least one packet combined in the combined packet for retransmission. In some aspects, the indication may comprise at least one of a list of identifiers for the at least one packet from the combined packet or a bitmap indicating the at least one packet from the combined packet.

In some aspects, at 620, the base station may generate another combined packet comprising the at least one packet based on the indication. Thus, in response to the feedback, the base station may retransmit the indicated packet(s) in another combined packet that is different from the first combined packet. The feedback, as well as the composition of the combined message, enable the base station to retransmit the packets of interest without retransmitting all of the packets in a first combined packet.

In some aspects, the indication may be received from a first UE of a first packet combined in the combined packet for retransmission. The base station may combine a second subset of the packets from the plurality of UEs into a second combined packet. The base station may broadcast the second combined packet from the base station, as illustrated at 622. Similarly, the base station may broadcast a plurality of combined packets from the base station. For example, the base station may receive a second indication from a second UE of a second packet combined in the second combined packet for retransmission, as illustrated at 624. The base station may generate a third combined packet comprising the first packet from the first combined packet and the second packet from the second combined packet, as illustrated at 626. Similarly, the base station may receive a plurality of indications from a plurality of combined packets and generate another combined packet based on the indications in the feedbacks from the plurality of combined packets. FIG. 5 illustrates an example in which the base station may receive feedback 530 with an indication for a packet within combined packet 1 and feedback 531 with an indication for a packet within combined packet 2. Based on the feedback, the base station may generate combined packet 3 that comprises the indicated packets from combined packet 1 and combined packet 2.

In some aspects, at 605, after receiving a packet from a UE among the packets received from the plurality of UEs, the base station may determine whether to broadcast the packet in the combined packet and/or as an uncombined packet. This determination may be based on an indication from the UE, as to whether or not the packet should be broadcast in a combined packet and/or whether the packet should be transmitted as an uncombined packet. This determination may be based on a detection of the packet in sidelink communication from the UE. For example, when the base station detects the packet has already been transmitted in sidelink from the UE, the base station may determine to only broadcast the packet in a combined packet. However, if the base station does not detect a sidelink transmission of the packet, the base station may determine to broadcast the packet in an uncombined manner, at 607. The base station may also broadcast the packet in a combined packet. In some aspects, at 607, the base station may broadcast the packet as an uncombined packet prior to combining the packet into the combined packet.

In some aspects, the base station may broadcast an indication of the packets to be broadcast from the base station in at least one combined packet during a session. In some aspects, the indication may comprise at least one of a number of the packets to be broadcast from the base station during the session or a list of the packets to be broadcast from the base station during the session. In some aspects, at least one combined packet may be broadcast in a broadcasting opportunity. In some aspects, the combined packet may be formed using an Exclusive Or (XOR) function on the plurality of original packets. In some aspects, the combined packet may be broadcast in a broadcast opportunity, where the broadcast opportunity comprises a MBSFN frame or a SC-PTM resource.

Figure 7:
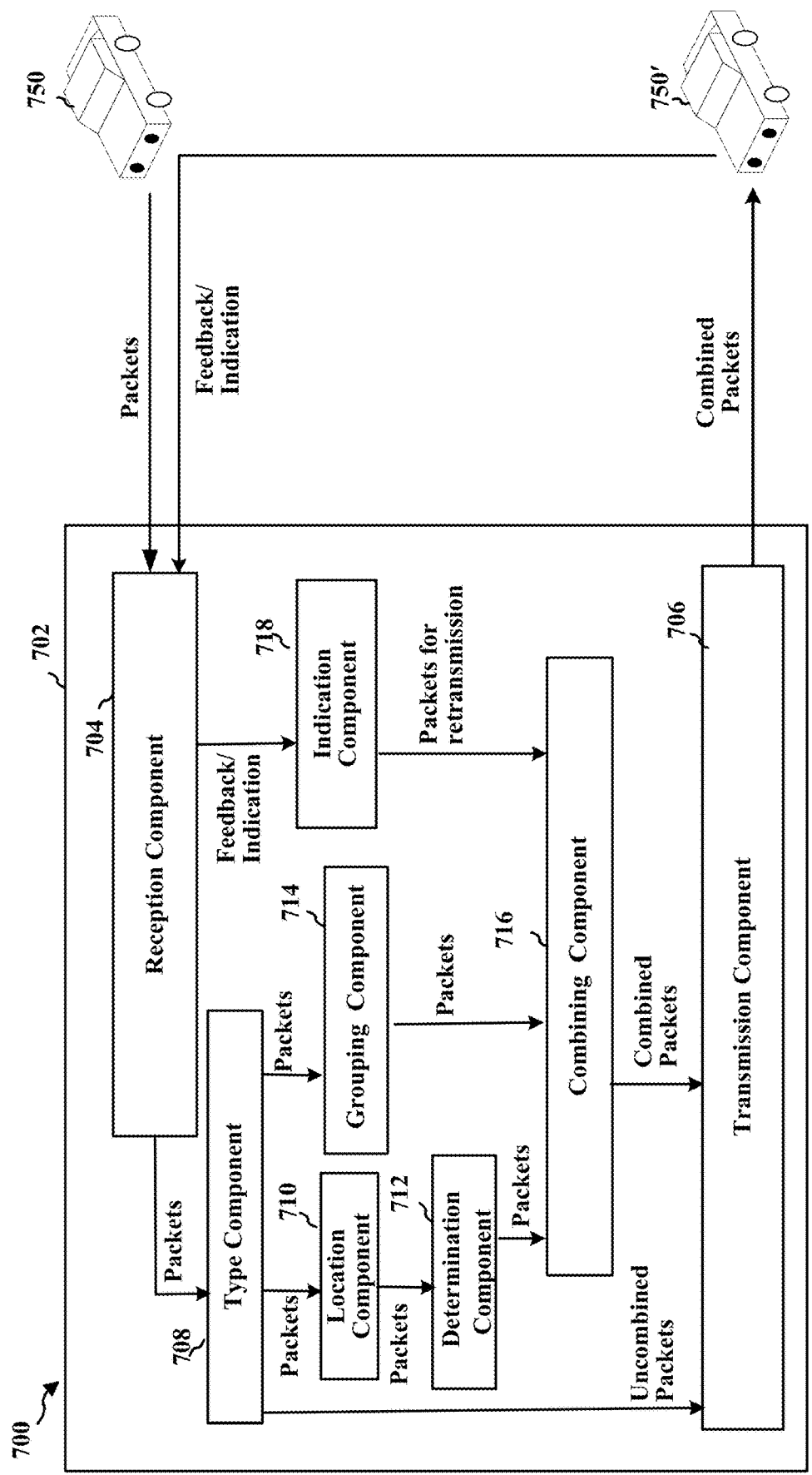
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus. The apparatus may be a base station (e.g., the base station 102', 402, 502, the apparatus 702/702', 1050, 1350 etc.) communicating with UEs (e.g., UE 104, 104', 404, 406, 407, 408, 409, 410, 504, 506, 507, 508, 510, 750, 750', the apparatus 1002/1002', the apparatus 1302/1302' etc.) in a wireless communication system. The wireless communication may comprise 5G/NR V2X or V2V communication. Aspects may also be applied to other direct D2D communication.

The apparatus includes a reception component 704 for receiving packets from a plurality of UEs at the base station. The apparatus may include a type component 706 for determining whether to broadcast a packet among the packets received from the plurality of UEs as an uncombined packet based on at least one of an indication from the UE or a detection of the packet in sidelink communication from the UE. The apparatus may broadcast, via a transmission component 706, the packet as an uncombined packet prior to combining the packet into the combined packet.

The apparatus may include a location component 710 for determining a location associated with each of the packets received by the base station. The apparatus may include a determination component 712 for determining whether to include each of the packets in the combined packet based on whether the location associated with a corresponding packet received by the base station is within an area.

The apparatus may include a grouping component 714 for grouping the subset of the packets in the combined packet based on a delivery probability requirement associated with each of the subset of the packets. For example, a target delivery probability of the combined packet may be based on a maximum delivery probability requirement associated with any of the subset of the packets combined in the combined packet. For example, the combined packet may comprise a first combined packet and a second combined packet. A first set of packets having a first level of the delivery probability requirement are included in the first combined packet, and a second set of packets having a second level of the delivery probability requirement are included in the second combined packet. Thus, packets with similar target delivery probability are combined together. For example, the first level may be higher than the second level, and a larger amount of resources may be allocated to the first set of combined packet than to the second set of combined packet.

The apparatus includes a combining component 716 for combining a subset of the packets from the plurality of UEs into the combined packet.

The apparatus includes the transmission component 706 for broadcasting the combined packet from the base station.

The apparatus may include an indication component 718 for receiving, via the reception component 704, an indication from a UE of at least one packet combined in the combined packet for retransmission. In some aspects, the indication may comprise at least one of a list of identifiers for the at least one packet from the combined packet or a bitmap indicating the at least one packet from the combined packet. In some aspects, the base station may generate another combined packet comprising the at least one packet based on the indication. In some aspects, the indication may be received from a first UE of a first packet combined in the combined packet for retransmission. The base station may combine, via the combining component 716, a second subset of the packets from the plurality of UEs into a second combined packet. The base station may broadcast, via the transmission component 706, the second combined packet from the base station. Similarly, the base station may broadcast a plurality of combined packets from the base station. For example, the base station may receive a second indication from a second UE of a second packet combined in the second combined packet for retransmission. The base station may generate, via the combining component 716, a third combined packet comprising the first packet from the first combined packet and the second packet from the second combined packet.

The apparatus may include additional components that perform each of the blocks of the algorithm in the aforementioned flowcharts of FIGS. 4-6. As such, each block in the aforementioned flowcharts of FIGS. 4-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
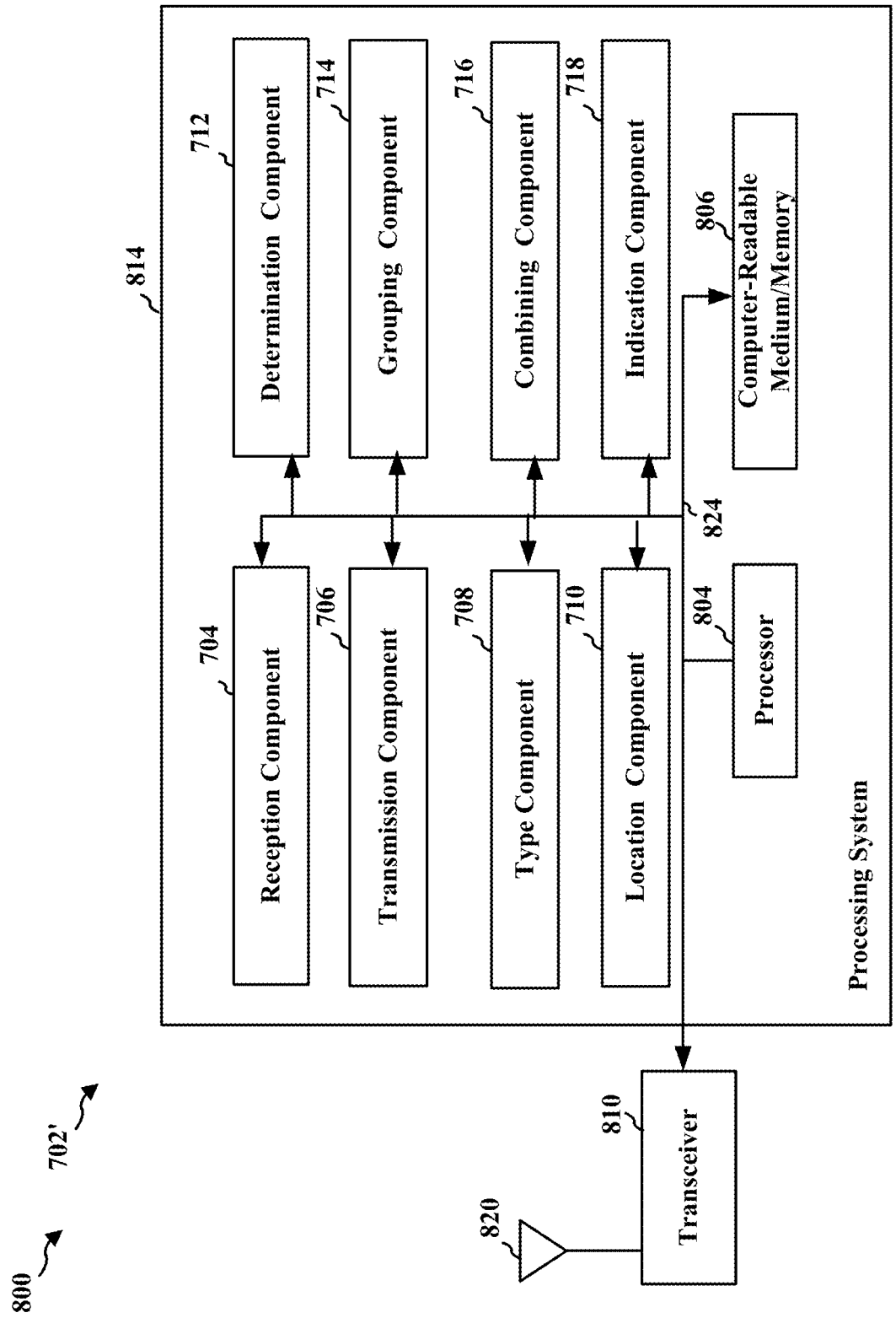
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 708, 706, 710, 712, 714, 716, 718 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718. The components may be software components running in the processor 804, resident/stored in the computer readable medium/memory 806, one or more hardware components coupled to the processor 804, or some combination thereof. In one configuration, the processing system 814 may be a component of a UE, e.g., device 350, and may include the memory 360 and/or at least one of the TX processor 368, the RX processor 356, and the controller/processor 359.

In one configuration, the apparatus 702/702' for wireless communication includes means for receiving packets from a plurality of UEs at the base station; means for combining a subset of the packets from the plurality of UEs into a combined packet; and means for broadcasting the combined packet from the base station. In some aspects, the apparatus 702/702' may further includes means for determining a location associated with each of the packets received by the base station and means for determining whether to include each of the packets in the combined packet based on whether the location associated with a corresponding packet received by the base station is within an area, where the area is based on a radius size surrounding a certain location. In some aspects, the apparatus 702/702' may group the subset of the packets in the combined packet based on a delivery probability requirement associated with each of the subset of the packets, where a target delivery probability of the combined packet is based on a maximum delivery probability requirement associated with any of the subset of the packets combined in the combined packet. In some aspects, the apparatus 702/702' may further include means for receiving an indication from a UE of at least one packet combined in the combined packet for retransmission; and means for generating a second combined packet comprising the at least one packet based on the indication. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
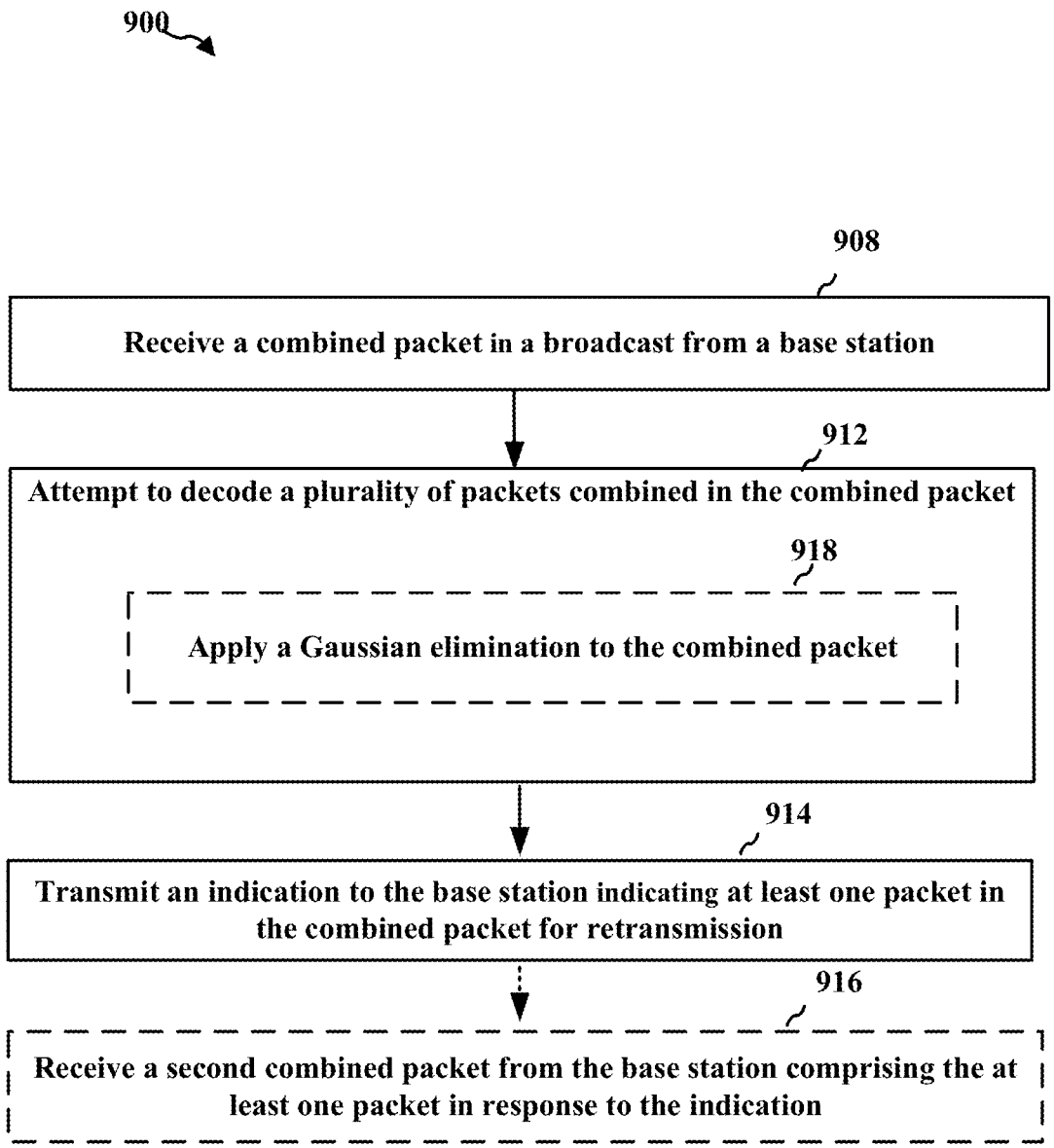
FIG. 9 is a flowchart of a method of wireless communication.

FIG. 9 is a flowchart 900 of a method of wireless communication. The method may be performed, for example, by a receiving UE (e.g., UE 104', 404, 410, 504, 510, 750', the apparatus 1002/1002', etc.) communicating a base station (e.g., the base station 102', 402, 502, the apparatus 702/702', 1050, etc.) in a wireless communication system. The wireless communication may comprise 5G/NR V2X or V2V communication. Aspects may also be applied to other direct D2D communication. For example, the UEs may be vehicles, or devices installed in vehicles, or other devices, as part a V2V/V2X/D2D network, e.g., based on 5G/NR communication. To facilitate an understanding of the techniques and concepts described herein, the method of flowchart 900 may be discussed with reference to the examples illustrated in FIGS. 4 and 5. Optional aspects may be illustrated in dashed lines.

At 908, the UE may receive a combined packet in a broadcast from a base station. While this example is described for a single combined packet, the UE may receive a plurality of combined packets from one or more base stations. For example, the combined packet may be similar to 520, 521 described in connection with FIG. 5 or the combined packet broadcast at 616 in FIG. 6.

At 910, the UE may attempt to decode a plurality of packets combined in the combined packet. In some aspects, the UE may apply a Gaussian elimination to the combined packet received from the base station to recover original packets from other UEs, as illustrated at 918.

At 914, the UE may transmit an indication to the base station indicating at least one packet in the combined packet for retransmission. In some aspects, the indication may comprise a list of identifiers for the at least one packet from the combined packet or a bitmap indicating the at least one packet from the combined packet. In some aspects, the combined packet comprises a first combined packet, the UE may receive a second combined packet, comprising a combination of a plurality of packets, from the base station comprising the at least one packet in response to the indication, as illustrated at 916.

Figure 10:
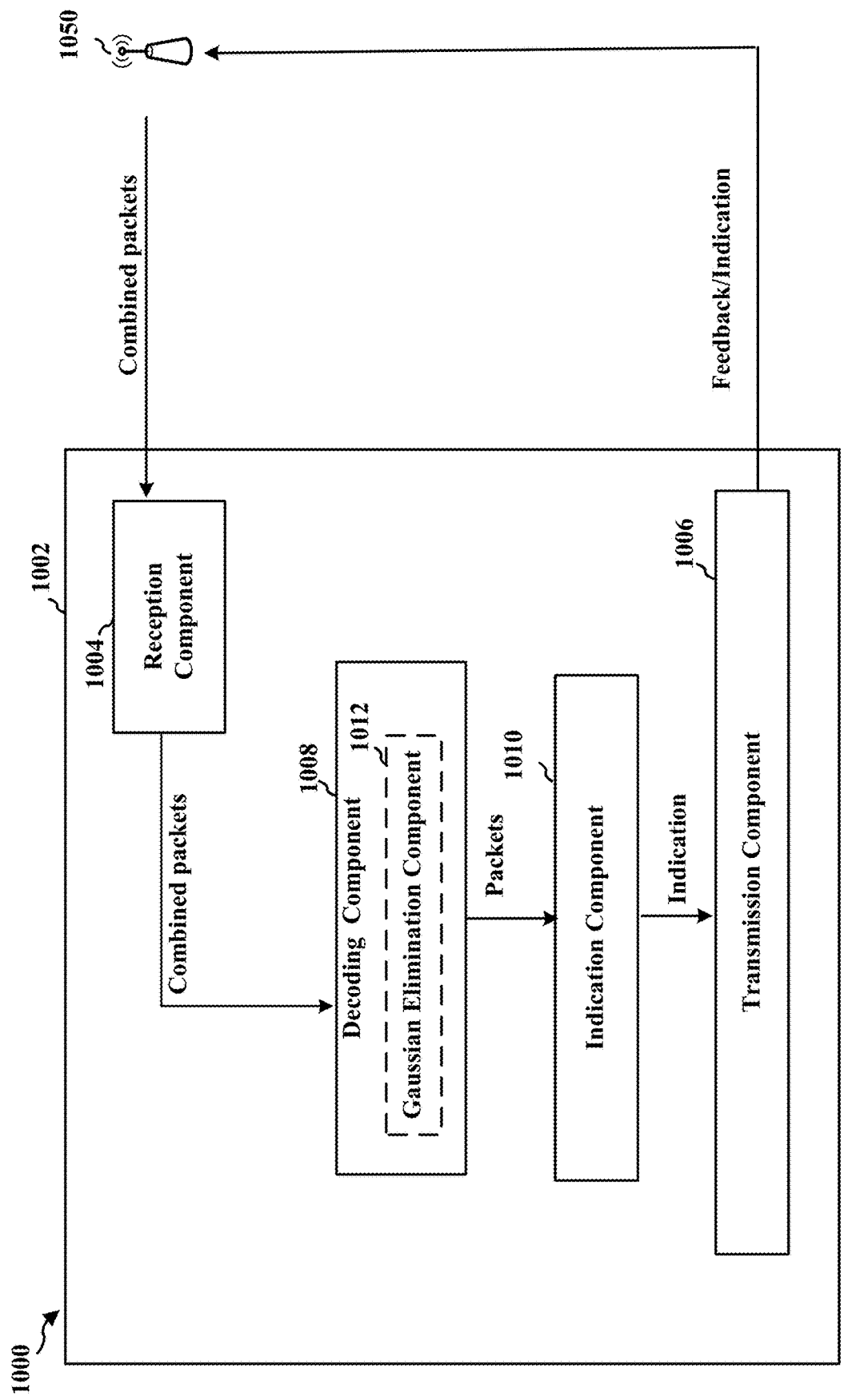
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus. The apparatus may be a receiving UE (e.g., UE 104', 404, 410, 504, 510, 750', the apparatus 1002/1002', etc.) communicating a base station (e.g., the base station 102', 402, 502, the apparatus 702/702', 1050, etc.) in a wireless communication system. The wireless communication may comprise 5G/NR V2X or V2V communication. Aspects may also be applied to other direct D2D communication.

The apparatus includes a reception component 1004 for receiving a combined packet in a broadcast from a base station.

The apparatus includes a decoding component 1008 for attempting to decode a plurality of packets combined in the combined packet. In some aspects, the apparatus may include a Gaussian elimination 1012 for applying a Gaussian elimination to the combined packet received from the base station to recover original packets from other UEs.

The apparatus includes an indication component 1010 for transmitting an indication, via a transmission component 1006, to the base station indicating at least one packet in the combined packet for retransmission. In some aspects, the apparatus may receive a second combined packet, via the reception component 1004, from the base station comprising the at least one packet in response to the indication.

The apparatus may include additional components that perform each of the blocks of the algorithm in the aforementioned flowcharts of FIGS. 4, 5 and 9. As such, each block in the aforementioned flowcharts of FIGS. 4, 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
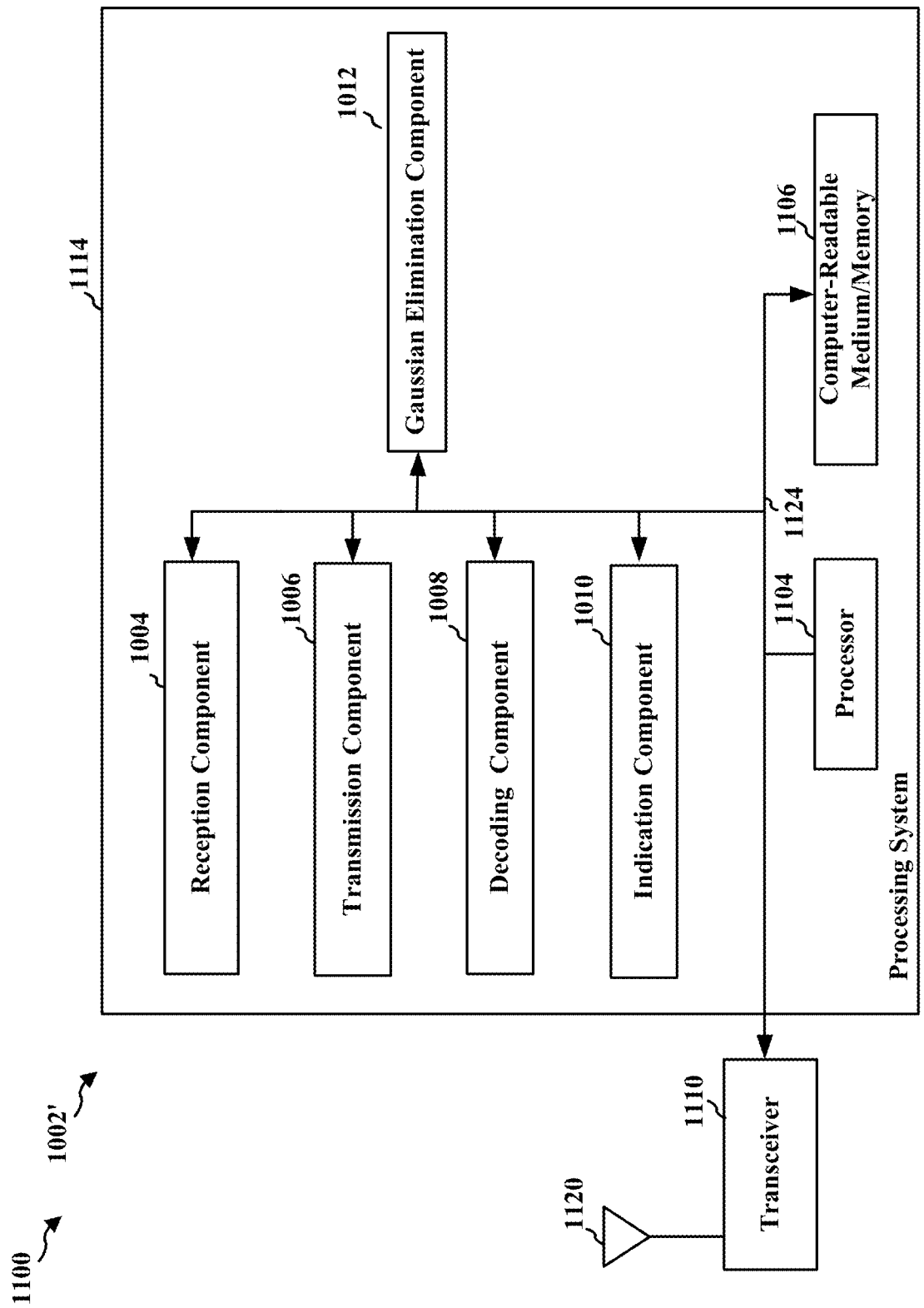
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. In one configuration, the processing system 1114 may be a component of device 350 and may include the memory 360 and/or at least one of the TX processor 368, the RX processor 356, and the controller/processor 359.

In one configuration, the apparatus 1002/1002' for wireless communication includes means for receiving a combined packet in a broadcast from a base station; means for attempting to decode a plurality of packets combined in the combined packet; and means for transmitting an indication to the base station indicating at least one packet in the combined packet for retransmission. In some aspects, the indication comprises a list of identifiers for the at least one packet from the combined packet or a bitmap indicating the at least one packet from the combined packet. In some aspects, wherein the combined packet comprises a first combined packet, the apparatus 1002/1002' may further include means for receiving a second combined packet from the base station comprising the at least one packet in response to the indication. In some aspects, the means for attempting to decode a plurality of packets combined in the combined packet is configured to apply a Gaussian elimination to the combined packet received from the base station to recover original packets from other UEs. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
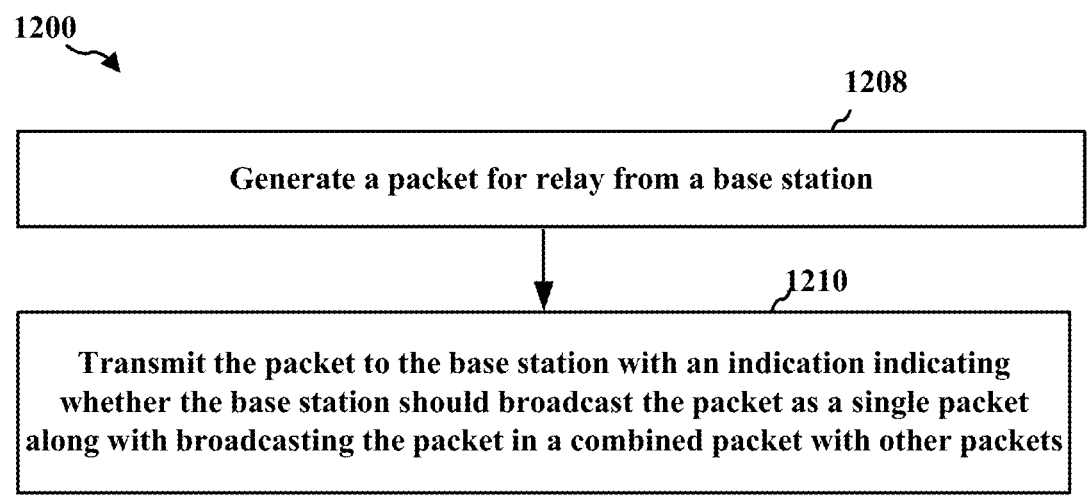
FIG. 12 is a flowchart of a method of wireless communication.

FIG. 12 is a flowchart 1200 of a method of wireless communication. The method may be performed, for example, by a transmitting UE (e.g., UE 104, 406, 407, 408, 409, 410, 506, 507, 508, 750, the apparatus 1302/1302', etc.) communicating a base station (e.g., the base station 102', 402, 502, the apparatus 702/702', 1350, etc.) in a wireless communication system. The wireless communication may comprise 5G/NR V2X or V2V communication. Aspects may also be applied to other direct D2D communication. For example, the UEs may be vehicles, or devices installed in vehicles, or other devices, as part a V2V/V2X/D2D network, e.g., based on 5G/NR communication. To facilitate an understanding of the techniques and concepts described herein, the method of flowchart 1200 may be discussed with reference to the examples illustrated in FIGS. 4 and 5. Optional aspects may be illustrated in dashed lines.

At 1208, the UE may generate a packet for relay from a base station. The packet may correspond to 503, 503b, or 503c.

At 1210, the UE may transmit the packet to the base station with an indication indicating whether the base station should broadcast the packet as a single packet along with broadcasting the packet in a combined packet with other packets. In some aspects, if the UE will transmit the packet via sidelink, the UE may transmit the packet to the base station with a first indication indicating that the base station should broadcast the packet in the combined packet without broadcasting the packet as the single packet. In some aspects, if the UE will not transmit the packet via sidelink, the UE may transmit the packet to the base station with a second indication indicating for the base station should broadcast the packet as the single packet along with broadcasting the packet in the combined packet.

Figure 13:
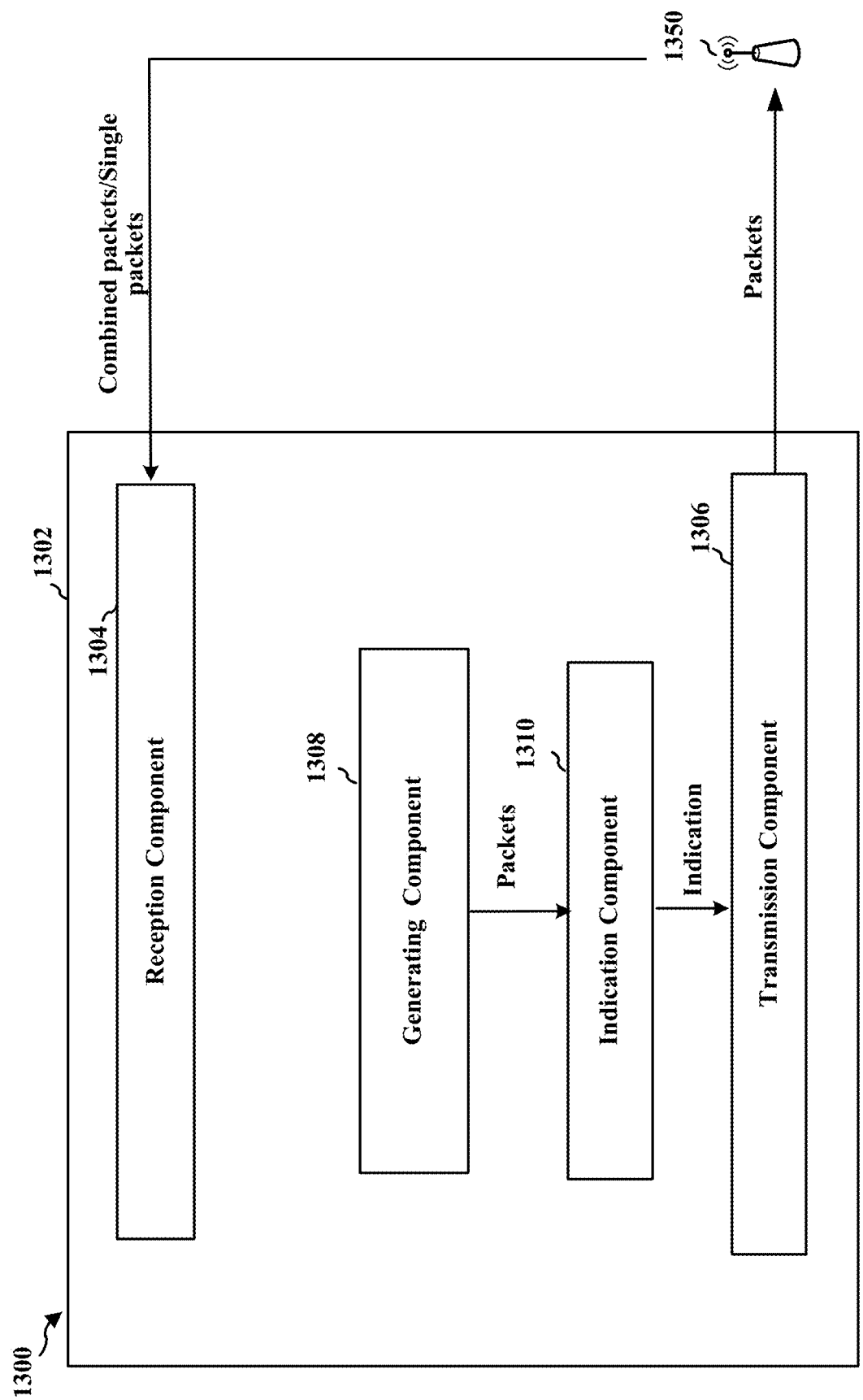
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus. The apparatus may be a transmitting UE (e.g., UE 104, 406, 407, 408, 409, 410, 506, 507, 508, 750, the apparatus 1302/1302', etc.) communicating a base station (e.g., the base station 102', 402, 502, the apparatus 702/702', 1350, etc.) in a wireless communication system. The wireless communication may comprise 5G/NR V2X or V2V communication. Aspects may also be applied to other direct D2D communication.

The apparatus may include a reception component 1304 for receiving DL transmissions from a base station and/or for receiving sidelink communication from other UEs.

The apparatus includes a generating component 1308 for generating a packet for relay from a base station.

The apparatus includes an indication component 1310 for transmitting, via a transmission component 1306, the packet to the base station with an indication whether the base station should broadcast the packet as a single packet along with broadcasting the packet in a combined packet with other packets. The packet may be transmitted to the base station via UL.

The apparatus may include additional components that perform each of the blocks of the algorithm in the aforementioned flowcharts of FIGS. 4, 5 and 12. As such, each block in the aforementioned flowcharts of FIGS. 4, 5 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
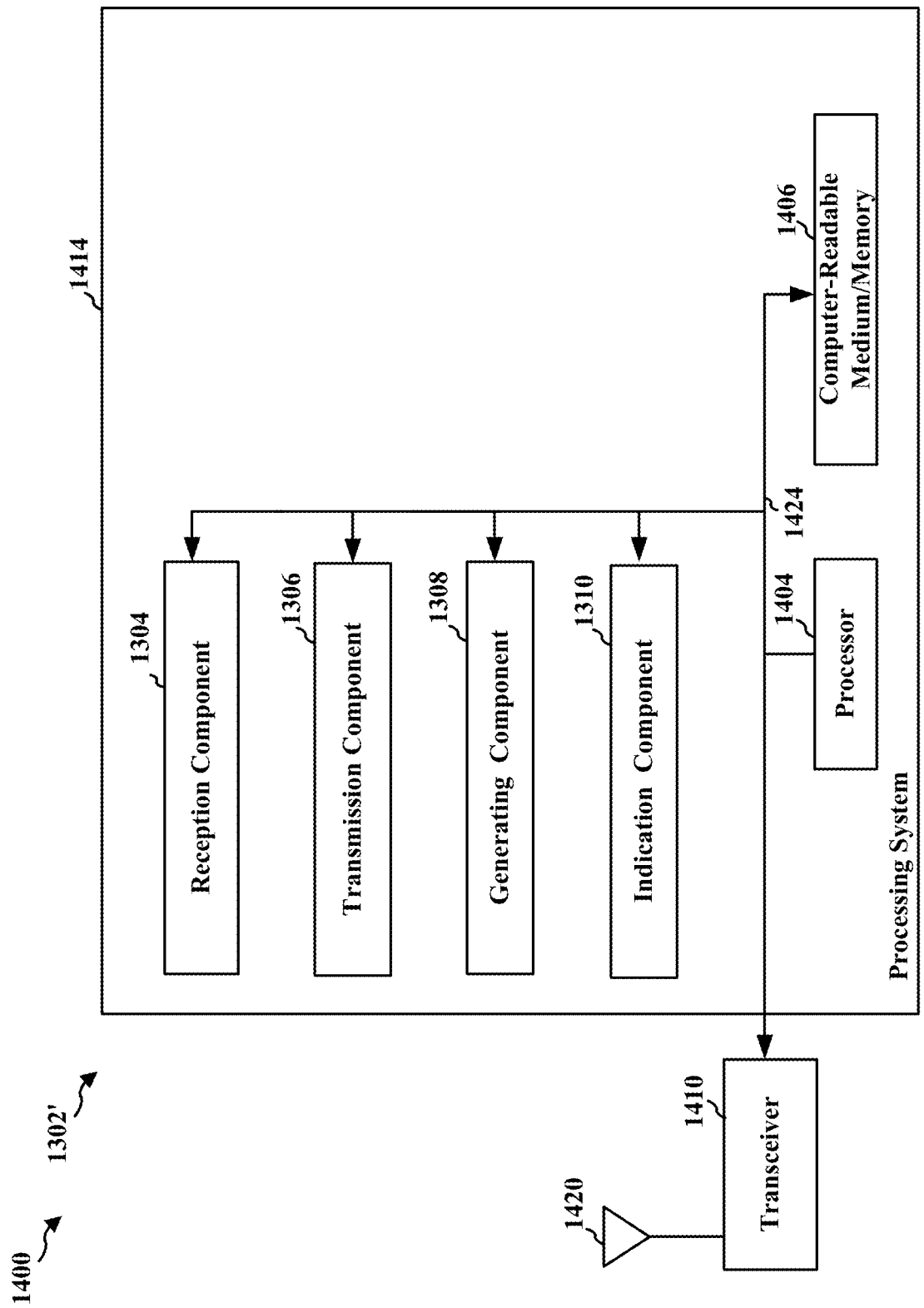
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. In one configuration, the processing system 1414 may be a component of the device 350 and may include the memory 360 and/or at least one of the TX processor 368, the RX processor 356, and the controller/processor 359.

In one configuration, the apparatus 1302/1302' for wireless communication includes means for generating a packet for relay from a base station; and means for transmitting the packet to the base station with an indication indicating whether the base station should broadcast the packet as a single packet along with broadcasting the packet in a combined packet with other packets. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   receiving packets from a plurality of User Equipments (UEs) at the base station;
   combining the packets from the plurality of UEs into a plurality of combined packets after receiving the packets, wherein each combined packet of the plurality of combined packets is of a same size; and
   broadcasting the plurality of combined packets from the base station.

2. The method of claim 1, further comprising:
   determining a location associated with each of the packets received by the base station; and
   determining whether to include each of a subset of the packets in a first combined packet of the plurality of combined packets based on whether the location associated with a corresponding packet received by the base station is within an area.

3. The method of claim 2, wherein the area is based on a radius size surrounding a certain location.

4. The method of claim 1, wherein the base station groups a subset of the packets in a first combined packet of the plurality of combined packets based on a delivery probability associated with each of the subset of the packets.

5. The method of claim 4, wherein a target delivery probability of the first combined packet is based on a maximum delivery probability associated with any of the subset of the packets combined in the first combined packet.

6. The method of claim 4, wherein the first combined packet comprises a second combined packet, and wherein a first set of packets having a first level of the delivery probability are included in the second combined packet and a second set of packets having a second level of the delivery probability are included in a third combined packet.

7. The method of claim 6, wherein the first level is higher than the second level, and wherein a larger amount of resources are allocated to the second combined packet than to the third combined packet.

8. The method of claim 1, wherein a first combined packet of the plurality of combined packets comprises a second combined packet, the method further comprising:
   receiving an indication from a UE of at least one packet combined in the first combined packet for retransmission; and
   generating a second combined packet comprising the at least one packet based on the indication.

9. The method of claim 8, wherein the indication comprises at least one of a list of identifiers for the at least one packet from the second combined packet or a bitmap indicating the at least one packet from the second combined packet.

10. The method of claim 1, further comprising:
    receiving a first indication for retransmission from a first UE of a first packet combined in a first combined packet of the plurality of combined packets;
    receiving a second indication for retransmission from a second UE of a second packet combined in a second combined packet of the plurality of combined packets; and
    generating a third combined packet comprising the first packet from the first combined packet and the second packet from the second combined packet.

11. The method of claim 1, further comprising:
    broadcasting a packet among the packets received from the plurality of UEs as an uncombined packet prior to combining the packet into a combined packet of the plurality of combined packets.

12. The method of claim 11, wherein the packet is received by the base station from a UE, the method further comprising:
    determining whether to broadcast the packet as the uncombined packet based on at least one of an indication from the UE or a detection of the packet in sidelink communication from the UE.

13. The method of claim 1, further comprising:
    broadcasting an indication of the packets to be broadcast from the base station in at least one combined packet during a session.

14. The method of claim 13, wherein the indication comprises at least one of a number of the packets to be broadcast from the base station during the session or a list of the packets to be broadcast from the base station during the session.

15. The method of claim 1, wherein at least one combined packet of the plurality of combined packets is broadcast in a broadcasting opportunity.

16. The method of claim 1, wherein at least one combined packet of the plurality of combined packets is formed using an Exclusive Or (XOR) function on a plurality of original packets.

17. The method of claim 1, wherein at least one combined packet of the plurality of combined packets is broadcast in a broadcast opportunity, wherein the broadcast opportunity comprises a Multimedia Broadcast multicast service Single Frequency Network (MBSFN) frame or a Single-Cell Point-To-Multipoint (SC-PTM) resource.

18. A method of wireless communication at a User Equipment (UE) comprising:
    receiving a combined packet in a broadcast from a base station, wherein a size of the received combined packet is same as a size of another combined packet broadcast from the base station;
    attempting to decode a plurality of packets combined in the received combined packet; and
    transmitting an indication to the base station indicating at least one packet in the received combined packet for retransmission based on the attempting to decode the at least one packet.

19. The method of claim 18, wherein the indication comprises a list of identifiers for the at least one packet from the combined packet or a bitmap indicating the at least one packet from the combined packet.

20. The method of claim 18, wherein the combined packet comprises a first combined packet, the method further comprising:
    receiving a second combined packet from the base station comprising the at least one packet in response to the indication.

21. The method of claim 18, wherein attempting to decode the combined packet comprises:
    applying a Gaussian elimination to the combined packet received from the base station to recover original packets from other UEs.

22. A method of wireless communication at a User Equipment (UE) comprising:
    generating a packet for relay from a base station; and
    transmitting the packet to the base station with an indication indicating whether the base station should broadcast the packet as a single packet along with broadcasting the packet in a combined packet with other packets.

23. The method of claim 22, wherein the UE transmits the packet to the base station with a first indication indicating that the base station should broadcast the packet in the combined packet without broadcasting the packet as the single packet if the UE will transmit the packet via sidelink.

24. The method of claim 22, wherein the UE transmits the packet to the base station with a second indication indicating for the base station should broadcast the packet as the single packet along with broadcasting the packet in the combined packet if the UE will not transmit the packet via sidelink.

25. An apparatus for wireless communication at a base station, comprising:
   a memory; and
   at least one processor coupled to the memory and configured to:
      receive packets from a plurality of User Equipments (UEs) at the base station;
      combine the packets from the plurality of UEs into a plurality of combined packets after receiving the packets; and
      broadcast the plurality of combined packets from the base station.

26. The apparatus of claim 25, wherein the at least one processor coupled to the memory is further configured to:
   determine a location associated with each of the packets received by the base station; and
   determine whether to include each of a subset of the packets in a first combined packet of the plurality of combined packets based on whether the location associated with a corresponding packet received by the base station is within an area.

27. The apparatus of claim 25, wherein the base station groups a subset of the packets in a first combined packet of the plurality of combined packets based on a delivery probability associated with each of the subset of the packets.

28. The apparatus of claim 27, wherein a target delivery probability of the first combined packet is based on a maximum delivery probability associated with any of the subset of the packets combined in the first combined packet.

29. The apparatus of claim 27, wherein the first combined packet comprises a second combined packet, and wherein a first set of packets having a first level of the delivery probability are included in the second combined packet and a second set of packets having a second level of the delivery probability are included in a third combined packet.

30. The apparatus of claim 29, wherein the first level is higher than the second level, and wherein a larger amount of resources are allocated to the second combined packet than to the third combined packet.

* * * * *